US012598005B2

(12) United States Patent
Koma et al.

(10) Patent No.: US 12,598,005 B2
(45) Date of Patent: Apr. 7, 2026

(54) STATION SIDE OPTICAL LINE TERMINAL AND REGISTRATION METHOD

(71) Applicant: NTT, Inc., Tokyo (JP)

(72) Inventors: Ryo Koma, Musashino (JP); Kazutaka Hara, Musashino (JP); Junichi Kani, Musashino (JP)

(73) Assignee: NTT, Inc., Tokyo (JP)

( * ) Notice: Subject to any disclaimer, the term of this patent is extended or adjusted under 35 U.S.C. 154(b) by 399 days.

(21) Appl. No.: 18/035,007

(22) PCT Filed: Nov. 12, 2020

(86) PCT No.: PCT/JP2020/042238
§ 371 (c)(1),
(2) Date: May 2, 2023

(87) PCT Pub. No.: WO2022/102047
PCT Pub. Date: May 19, 2022

(65) Prior Publication Data
US 2023/0403082 A1     Dec. 14, 2023

(51) Int. Cl.
H04Q 11/00          (2006.01)
H04B 10/85          (2013.01)

(52) U.S. Cl.
CPC ..... H04B 10/85 (2013.01); H04Q 2011/0064 (2013.01)

(58) Field of Classification Search
None
See application file for complete search history.

(56) References Cited

U.S. PATENT DOCUMENTS

| | | | | |
|---|---|---|---|---|
| 7,301,968 B2 * | 11/2007 | Haran | ................ | H04Q 11/0067 370/508 |
| 8,189,598 B2 * | 5/2012 | Haran | .................... | H04L 47/36 370/395.41 |
| 8,380,065 B2 * | 2/2013 | Okuno | ................ | H04L 43/0864 398/52 |
| 2015/0288683 A1 * | 10/2015 | Cheng | ................. | H04L 63/0846 713/168 |
| 2016/0294620 A1 * | 10/2016 | Bang | .................. | H04Q 11/0067 |
| 2017/0279527 A1 | 9/2017 | Kim et al. | | |

FOREIGN PATENT DOCUMENTS

| | | |
|---|---|---|
| JP | 2010278525 A | 12/2010 |
| WO | WO-2017013789 A1 | 1/2017 |

OTHER PUBLICATIONS

Recommendation ITU-T G.989.3, 40-Gigabit-capable passive optical networks (NG-PON2): Transmission convergence layer specification, 2015.
Ryo Koma et al., Burst-Mode Digital Signal Processing That Pre-Calculates FIR Filter Coefficients for Digital Coherent PON Upstream, vol. 10, No. 5, May 2018, J. Opt. Commun. Netw. 461-470.

* cited by examiner

*Primary Examiner* — Jai M Lee

(57) ABSTRACT

An optical line terminal includes a communication unit configured to communicate with a plurality of optical network units, and a control unit configured to dynamically change at least one of a time width of a specific period and a cycle of the specific period, the specific period being a period in which an authentication request signal is received from the new optical network unit via the communication unit.

7 Claims, 8 Drawing Sheets

STATION SIDE OPTICAL LINE TERMINAL AND REGISTRATION METHOD

CROSS-REFERENCE TO RELATED APPLICATIONS

This application is a 371 U.S. National Phase of International Application No. PCT/JP2020/042238, filed on Nov. 12, 2020. The entire disclosure of the above application is incorporated herein by reference.

TECHNICAL FIELD

The present invention relates to a station side optical line terminal and a registration method.

BACKGROUND ART

As one optical access system, a passive optical network (PON) system including an optical line terminal (hereinafter referred to as "OLT") and an optical network unit (hereinafter referred to as "ONU") has been proposed.

FIG. 10 is a diagram illustrating a configuration example of a conventional PON system 1000. The PON system 1000 includes an OLT 100 and a plurality of ONUs 200-1 to 200-N (N is an integer of 2 or more). The OLT 100 and the ONUs 200-1 to 200-N are communicably connected via an optical multiplexer/demultiplexer 300 including an optical transmission line, an optical splitter, and the like. Note that the plurality of ONUs 200-1 to 200-N will be simply referred to as "ONUs 200" when they are not distinguished from one another.

In downlink communication that is communication from the OLT 100 to the ONU 200, the OLT 100 transmits a downlink signal 110 that is continuous light toward the ONU 200. Each ONU 200 selectively receives a signal in an arbitrary time slot allocated to each ONU 200 among the downlink signals 110 transmitted from the OLT 100 via the optical multiplexer/demultiplexer 300.

In uplink communication that is communication from the ONU 200 to the OLT 100, each ONU 200 transmits an uplink signal 210 that is a temporally intermittent burst signal in a time slot allocated in advance by the OLT 100 according to a band required by each ONU 200.

In a case where the unauthenticated ONU 200 is communicably connected to the OLT 100, authentication processing of the unauthenticated ONU 200 is executed. FIG. 11 is a diagram for illustrating authentication processing and uplink communication on a conventional time axis.

The authentication processing of the ONU 200 is periodically performed by the OLT 100, for example, and searches for an unconnected ONU 200. During this time, data communication in uplink communication cannot be performed. Specifically, the OLT 100 transmits a terminal authentication signal called a discovery gate to the ONU 200. With the reception of the terminal authentication signal, the ONU 200 transmits an authentication request signal called a register request to the OLT 100. Here, the unauthenticated ONU 200 is not time-synchronized with the OLT 100 or another ONU 200. Therefore, if the unauthenticated ONUs 200 receive the terminal authentication signals and simultaneously transmit the authentication request signals to the OLT 100, the terminal authentication signals may collide in the optical multiplexer/demultiplexer 300. Therefore, each unauthenticated ONU 200 suppresses the collision of the terminal authentication signals by randomly delaying the time for transmitting the authentication request signal. Note that the time for randomly delaying the transmission timing of the authentication request signal is referred to as a random delay time.

Upon receiving the authentication request signal in a specific period called a discovery window, the OLT 100 authenticates the ONU 200 that has transmitted the authentication request signal and registers the signal. This specific period has a predetermined time width and is periodically provided on the time axis. For example, the specific period is set with a value obtained by adding a total value of a difference between a minimum value and a maximum value of a propagation delay between the OLT 100 and the ONU 200 and a maximum value of a random delay time allocated to the ONU 200, a delay time of processing of the ONU 200 or the OLT 100, and the like (see, for example, Non Patent Literature 1).

CITATION LIST

Non Patent Literature

Non Patent Literature 1: G.989.3: 40-Gigabit-capable passive optical networks (NG-PON2): Transmission convergence layer specification.

Non Patent Literature 2: R. Koma, M. Fujiwara, J. Kani, K. Suzuki and A. Otaka, "Burst-mode digital signal processing that pre-calculates FIR filter coefficients for digital coherent pon upstream," in IEEE/OSA Journal of Optical Communications and Networking, vol. 10, no. 5, pp. 461-470, May 2018.

SUMMARY OF INVENTION

Technical Problem

However, as illustrated in FIG. 12, when the number of unauthenticated ONUs 200 increases, a collision with an authentication request signal transmitted from another ONU 200 occurs. For this reason, the time width of the specific period for receiving the authentication request signal may be increased in advance (see, for example, Non Patent Literature 2). However, in the conventional OLT 100, since the time width and the cycle of the specific period set once cannot be changed, the time zone in which the uplink communication cannot be performed increases depending on the time width of the specific period to be set, and the band utilization efficiency of the uplink communication decreases.

In view of the above circumstances, an object of the present invention is to provide a technique capable of improving band utilization efficiency of uplink communication.

Solution to Problem

An aspect of the present invention is an optical line terminal including a communication unit configured to communicate with a plurality of optical network units, and a control unit configured to dynamically change at least one of a time width of a specific period and a cycle of the specific period, the specific period being a period in which an authentication request signal is received from the new optical network unit via the communication unit.

An aspect of the present invention is a registration method in which an optical line terminal registers a new optical network unit, the method including a change step of dynamically changing at least one of a time width of a specific period for receiving an authentication request signal from the new optical network unit and a cycle of the specific period; and a registration step of registering the optical network unit that has transmitted the received authentication request signal in a case where the authentication request signal is received from the new optical network unit within the specific period changed in the change step.

Advantageous Effects of Invention

According to the present invention, band utilization efficiency of uplink communication can be improved.

DESCRIPTION OF EMBODIMENTS

The following is a description of an embodiment of the present invention, with reference to the drawings.

First Embodiment

Figure 1:
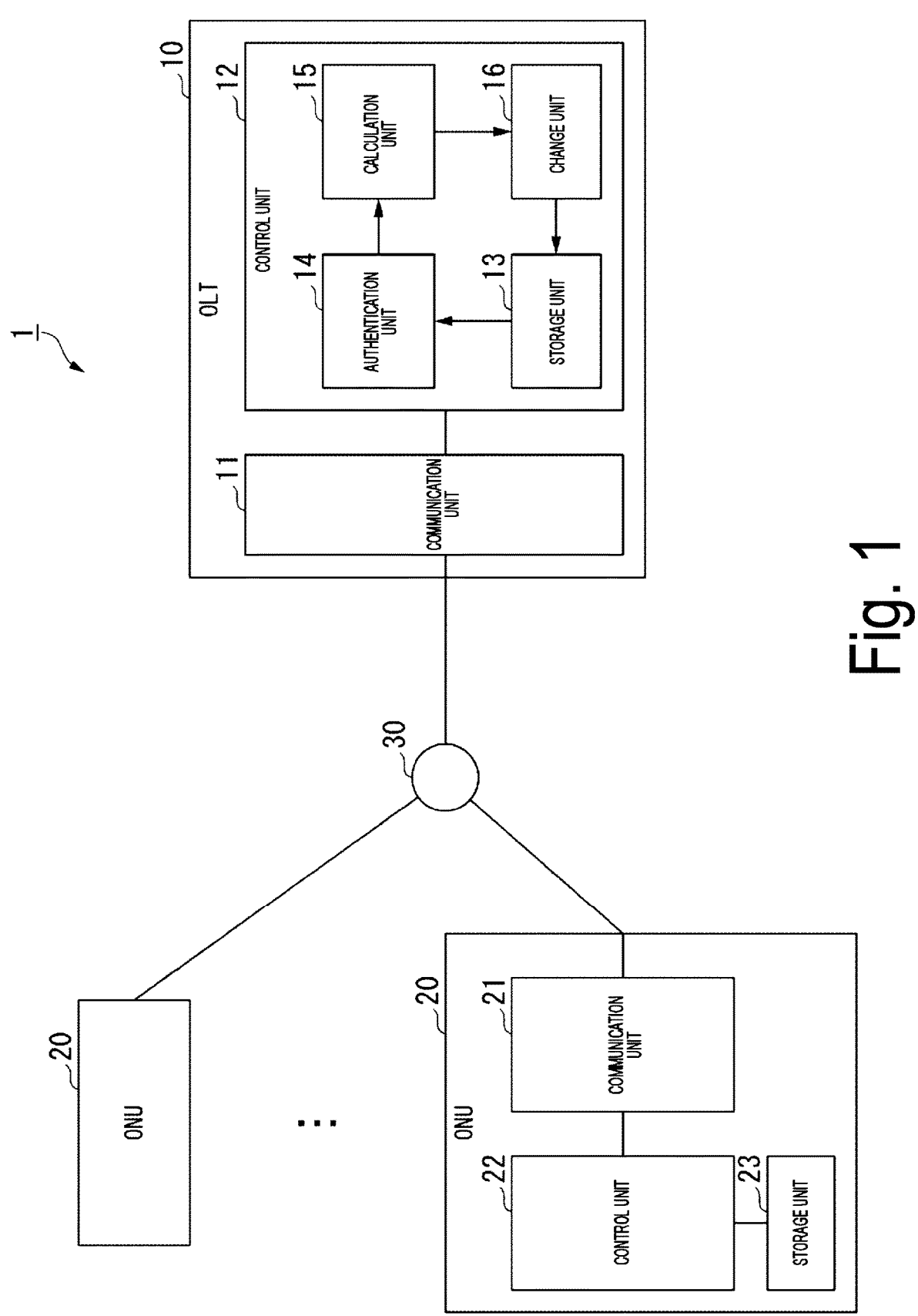
FIG. 1 is a diagram illustrating a configuration example of an optical communication system in a first embodiment.

FIG. 1 is a diagram illustrating a configuration example of an optical communication system 1 in a first embodiment. The optical communication system 1 of the first embodiment is, for example, a PON system.

The optical communication system 1 includes an optical line terminal (OLT) 10 and a plurality of optical network units (ONUs) 20-1 to 20-N. The OLT 10 and the ONUs 20-1 to 20-N are communicably connected via an optical multiplexer/demultiplexer 30 including an optical transmission line, an optical splitter, and the like. Note that the plurality of ONUs 20-1 to 20-N will be simply referred to as "ONU 20" when they are not distinguished from one another. A direction from the ONU 20 to the OLT 10 is referred to as uplink, and a direction from the OLT 10 to the ONU is referred to as downlink.

The OLT 10 performs uplink communication or downlink communication with the ONU 20. A communication system of the uplink communication or the downlink communication is not particularly limited, and a time division multiplexing system or a wavelength division multiplexing system may be used. The OLT 10 transmits a downlink signal to the ONU 20 in the downlink communication. The OLT 10 receives an uplink signal from the ONU in the uplink communication. In a case where an unauthenticated ONU 20 is communicably connected to the OLT 10, for example, the OLT 10 performs authentication processing for the unauthenticated ONU 20 to register the ONU 20. The authentication processing of the ONU 20 is periodically performed by the OLT 10, for example, and involves searching for an unconnected ONU 20. During this time, data communication in uplink communication cannot be performed. Here, when executing the authentication processing of the ONU 20, the OLT 10 dynamically changes at least one of a time width $\Delta t$ and a cycle T of a specific period called a discovery window. As a result, the OLT 10 can improve a decrease in the band utilization efficiency of the uplink communication.

Each ONU 20 selectively receives a signal in an arbitrary time slot allocated to each ONU 20 among the downlink signals transmitted from the OLT 10 via the optical multiplexer/demultiplexer 30. In uplink communication that is communication from the ONU 20 to the OLT 10, each ONU 20 transmits an uplink signal that is a temporally intermittent burst signal in a time slot allocated in advance by the OLT 10 according to a band required by each ONU 20.

Hereinafter, a schematic configuration of the OLT 10 for executing the authentication processing according to the first embodiment will be described.

The OLT 10 includes a communication unit (communicator) 11 and a control unit (controller) 12. A part or all of the control unit 12 may be realized by, for example, a processor such as a central processing unit (CPU) executing a program stored in the storage unit 13, or may be realized by using hardware such as a large scale integration (LSI) or an application specific integrated circuit (ASIC).

The communication unit 11 transmits and receives optical signals to and from the ONU 20. For example, the communication unit 11 transmits a terminal authentication signal indicating an authentication request to the ONU 20. For example, the communication unit 11 receives an authentication request signal from the ONU 20.

When executing the authentication processing of the ONU 20, the control unit 12 dynamically changes at least one of the time width $\Delta t$ of a specific period that is a period for receiving an authentication request signal from a new ONU 20 via the communication unit 11 and the cycle T of the specific period. As an example, the control unit 12 dynamically changes at least one of the time width $\Delta t$ and the cycle T based on the authentication statuses of the plurality of ONUs 20. The authentication status of the plurality of ONUs 20 is information related to authentication of the ONUs 20, and includes a change in time of the number of unauthenticated ONUs 20 (hereinafter, referred to as the "unauthenticated number"), the number of newly authenticated ONUs 20 (hereinafter, referred to as the "new authentication number"), and the like.

Hereinafter, an example of the configuration of the control unit 12 will be described. The control unit 12 includes, for example, a storage unit 13, an authentication unit 14, a calculation unit 15, and a change unit 16.

The storage unit 13 stores a set value of the time width Lt of the specific period (hereinafter referred to as a "first set value") and a set value of the cycle T (hereinafter referred to as a "second set value").

The authentication unit 14 reads the first set value and the second set value stored in the storage unit 13. The authentication unit 14 receives an authentication request signal from an unauthenticated ONU 20 in a specific period in which the time width Δt is a first set value and the cycle T is a second set value. The authentication unit 14 does not receive an authentication request signal from an unauthenticated ONU 20 outside the specific period. In a case where the authentication request signal is received within the specific period, the authentication unit 14 authenticates the ONU 20 that is the transmission source of the received authentication request signal, and registers information of the authenticated ONU 20 in the storage unit 13.

The calculation unit 15 acquires information on the authentication status of the ONU 20 from the authentication unit 14. Then, the calculation unit 15 calculates at least one of the time width Δt and the cycle T based on the information on the authentication status of the ONU 20.

The change unit 16 changes the setting of the first set value stored in the storage unit 13 to the calculated value of the time width Δt calculated by the calculation unit 15. The change unit 16 changes the setting of the second set value stored in the storage unit 13 to the calculated value of the cycle T calculated by the calculation unit 15. However, the change unit 16 only needs to change at least one of the first set value and the second set value, and does not need to change both set values. That is, the change unit 16 changes the setting of one or both of the first set value and the second set value.

The change unit 16 causes the communication unit 11 to transmit, to each ONU 20, a terminal authentication signal including information on the first set value and the second set value whose settings have been changed. However, the present invention is not limited thereto, and for example, the change unit 16 may cause the communication unit 11 to transmit, to each ONU 20, a terminal authentication signal including the maximum value of the random delay time corresponding to the first set value whose setting has been changed and the second set value whose setting has been changed. For example, the change unit 16 may set a random delay time of each unauthenticated ONU 20 corresponding to the first set value whose setting has been changed, and may cause the communication unit 11 to transmit a terminal authentication signal including the random delay time and the second set value to each ONU 20.

In a case where the OLT 10 transmits the information on the first set value and the second set value to the ONU 20, the information may be transmitted through a communication path different from the main signal of the uplink signal or the downlink signal. For example, the OLT 10 may transmit, to the ONU 20, a control signal superimposed on a frequency different from the frequency of the main signal, or information on the first set value and the second set value whose settings have been changed using another communication path such as wireless communication.

Hereinafter, a schematic configuration of the ONU 20 for executing the authentication processing of the present embodiment will be described. The ONU 20 of the present embodiment includes a communication unit 21, a control unit 22, and a storage unit 23.

The communication unit 21 transmits and receives optical signals to and from the communication unit 11. For example, the communication unit 21 receives the terminal authentication signal from the communication unit 11. The communication unit 21 transmits an authentication request signal to the communication unit 11 at a timing when a random delay time set in the storage unit 23 elapses after receiving the terminal authentication signal.

The control unit 22 stores the random delay time according to the terminal authentication signal received by the communication unit 21 in the storage unit 23. For example, the control unit 22 changes the set value of the random delay time stored in the storage unit 23 to the random delay time according to the first set value or the maximum value of the random delay time and the second set value included in the terminal authentication signal.

A set value of the random delay time is stored in the storage unit 23. This set value is updated by the control unit 22.

Next, a method of calculating the time width Δt and the cycle T in the calculation unit 15 will be described. First, a method of calculating the time width Δt will be described. (Method of Calculating Time Width Δt)

The time width Δt includes a propagation delay amount and a random delay amount. The propagation delay amount is a time in consideration of a propagation delay between the OLT 100 and each ONU 20, and for example, a difference between a minimum value and a maximum value of each propagation delay is set as an initial value. The random delay amount is the maximum value of the random delay time set in the next specific period (authentication phase). Further, the time width Δt may include a delay time of processing of the ONU 20 or the OLT 100. For example, the calculation unit 15 changes the time width Δt by changing the value of the random delay amount on the basis of the information on the authentication status of the ONU 20.

For example, the calculation unit 15 calculates the random delay amount such that the probability P of the number of ONUs 20 expected to be authenticated in one specific period is equal to or greater than a preset threshold Pth with respect to the current unauthenticated number n. For example, the probability P is a probability of the number of ONUs 20 expected to be authenticated in the next specific period with respect to the current unauthenticated number n.

The unauthenticated number n is a difference between a maximum value of the number of ONUs 20 that can be authenticated and the number of authenticated ONUs 20. The maximum value of the number of ONUs 20 that can be authenticated may be set to an arbitrary value, or may be set from the number of users allocated to the OLT 100 from the operating system in which the service provision information and the like are described.

A probability P is calculated by the following equation (1) as an expected value E(n) of the number of ONUs 20 to be authenticated, for example. As a method of calculating the probability P, for example, the method described in Reference Literature 1 may be used.

(Reference Literature 1: Glen Kramer "Ethernet Passive Optical Networks" Communications Engineers, Apr. 28, 2005). However, the present invention is not limited thereto, and for example, the probability P may be a value obtained by dividing the expected value E(n) by the current authentication number n.

[Math. 1]

$$E\{n\} \cong n\left(1 - \frac{M}{W - M}\right)^{2n-2} \tag{1}$$

In Equation (1), W is the maximum value of the random delay time of the current unauthenticated ONU 20. In Equation (1), M is the signal length of the uplink signal, and n is the current unauthenticated number.

As an example, the calculation unit 15 has random delay information in which the probability P and the random delay amount are associated with each unauthenticated number n in advance. The random delay information may be determined experimentally or theoretically, for example. The random delay information may be a calculation formula, a table format, or another format.

Figure 2:
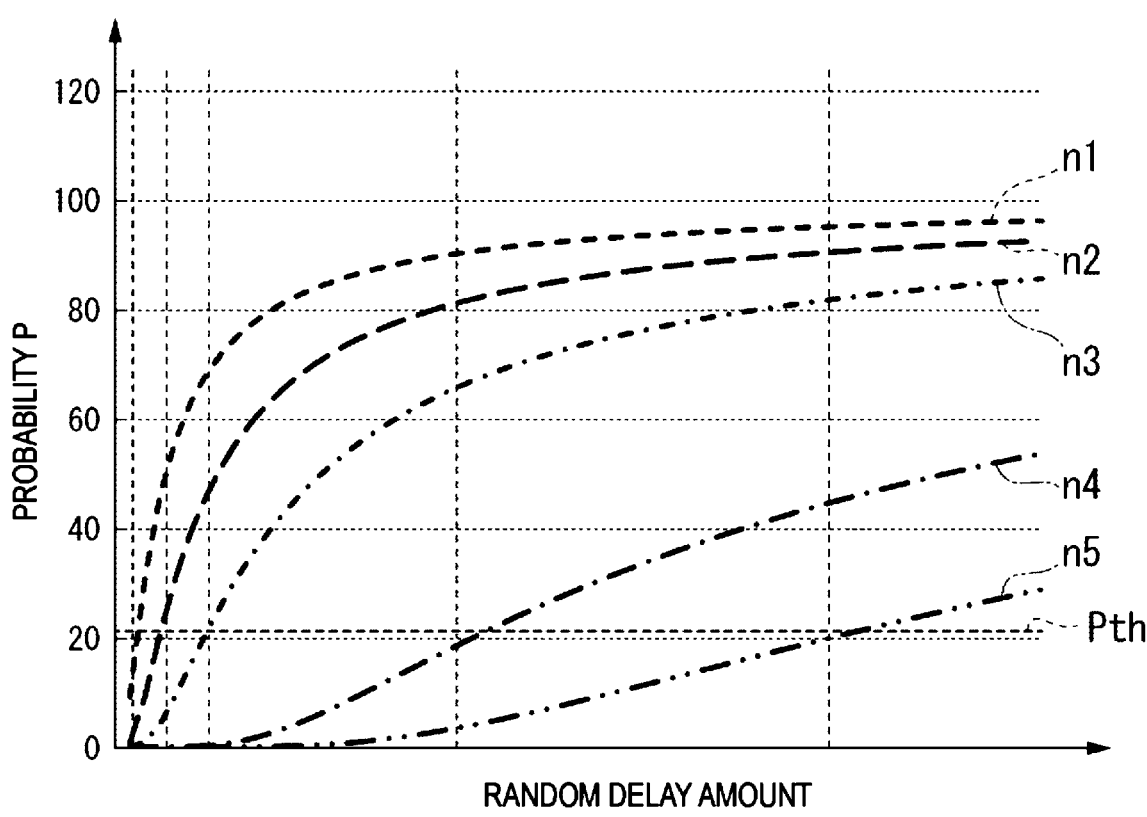
FIG. 2 is a graph illustrating an example of random delay information according to the first embodiment.
Figure 3:
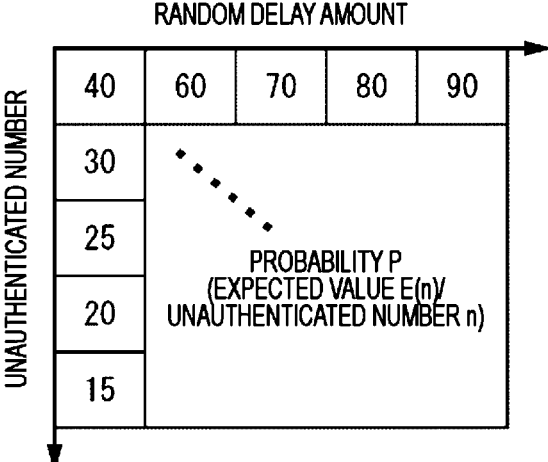
FIG. 3 is a diagram illustrating random delay information in a table format according to the first embodiment.
Figure 4:
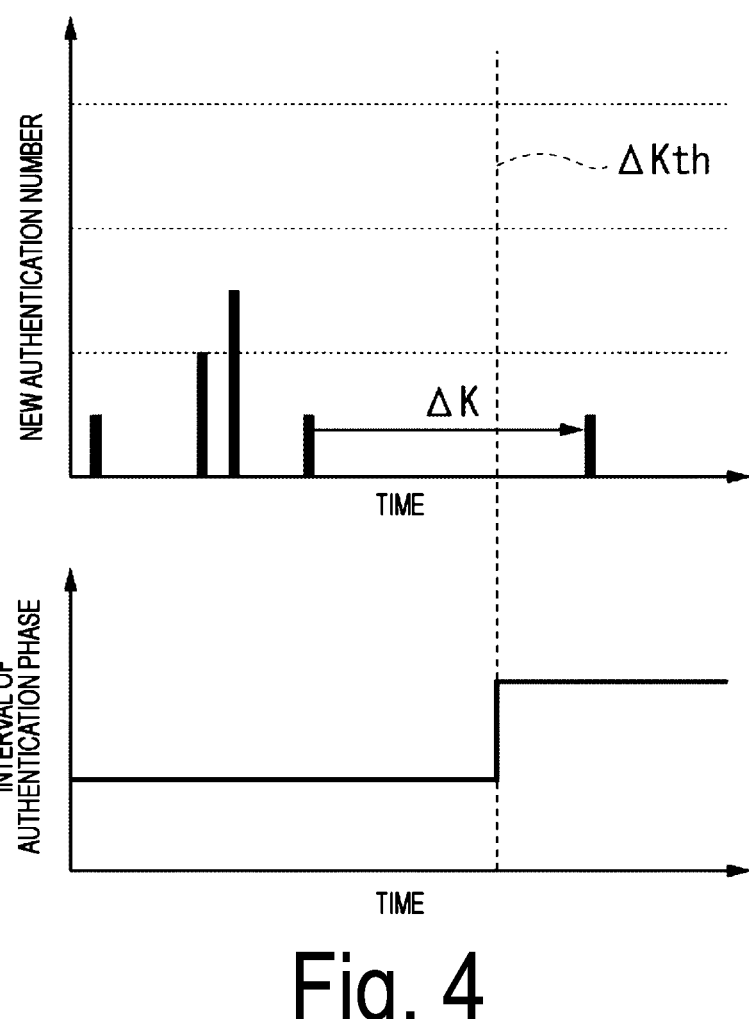
FIG. 4 is a diagram for illustrating a method of calculating a cycle T in the first embodiment.

FIG. 2 is a graph illustrating an example of random delay information. In the graph of FIG. 2, the horizontal axis represents the random delay amount, and the vertical axis represents a value in which a probability P(E(n)/n) is expressed as a percentage. FIG. 2 illustrates a relationship between the probability P and the random delay amount for five unauthenticated numbers n1, n2, n3, n4, and n5 as an example of the random delay information. The magnitude relationship of the five unauthenticated numbers n is represented as n1<n2<n3<n4<n5. FIG. 3 is a diagram illustrating random delay information in a table format. As illustrated in FIGS. 2 and 3, in the random delay information, the random delay amount in which the probability P is equal to or larger than the threshold Pth increases as the unauthenticated number n increases. In other words, it is indicated that the random delay amount in which the probability P satisfies the threshold Pth is reduced as the unauthenticated number n decreases. Therefore, when the authentication processing is performed several times and the unauthenticated number n gradually decreases, the random delay amount becomes a small value.

The calculation unit 15 acquires information of the current unauthenticated number n from the authentication unit 14, and calculates a random delay amount in which the probability P is the probability Pth or more in the acquired current unauthenticated number n from, for example, random delay information in a table format. As a result, the calculation unit 15 can calculate the time width Δt according to the authentication status of the ONU 20 as an example. For example, the calculation unit 15 calculates the time width Δt with the portion of the propagation delay amount as an initial value and the portion of the random delay amount as a calculated value. However, the present invention is not limited thereto, and the calculation unit 15 may change the time width Δt by varying a part of the propagation delay amount. For example, the calculation unit 15 may calculate the propagation delay amount on the basis of the maximum transmission distance set by the user carrier. In this case, the calculation unit 15 may calculate the time width Δt using a portion of the propagation delay amount as a calculated value and a portion of the random delay amount as a calculated value or the maximum value W. Note that the calculation value of the random delay amount calculated by the calculation unit 15 may be a random delay amount in which the probability P is equal to or greater than the probability Pth, but it is preferable that the random delay amount be small.

(Calculation Method of Cycle T)

The cycle T of the specific period is calculated based on the time change of the new authentication number. For example, in a case where the new authentication number is equal to or smaller than a threshold value Uth at a preset time interval ΔK, the calculation unit 15 may widen the interval of the authentication phase, that is, calculate a cycle longer than the currently set cycle T (second set value) as the cycle T. The case where the new authentication number is equal to or smaller than the threshold Uth includes a case where the new authentication number is zero.

For example, in a case where the new authentication number U is equal to or less than the threshold value Uth in a time interval ΔK from a timing at which there is a new authentication number equal to or greater than the threshold value Uth until a certain time elapses, the calculation unit 15 calculates the cycle T of a specific period so that an interval of a next authentication phase becomes wider than an interval of a current authentication phase.

Figure 5:
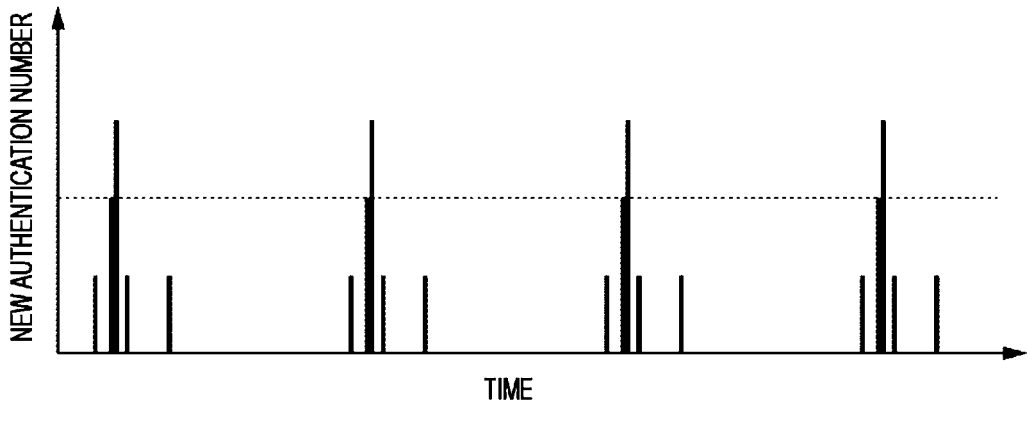
FIG. 5 is a diagram illustrating an example of a trend of a timing of new authentication of an ONU in the past in the first embodiment.

FIG. 5 is a diagram illustrating an example of a trend of a timing of new authentication of the ONU 20 in the past. As illustrated in FIG. 5, in a case where the timing of the new authentication of the ONU 20 has periodicity, or the like, the calculation unit 15 may calculate the period T of the specific period in accordance with the tendency of the timing of the new authentication. For example, the calculation unit 15 may obtain in advance information indicating the tendency of the timing of new authentication of the ONU 20 for each predetermined period such as each day or each time, and calculate the cycle T so as to provide a specific period at the timing when the ONU 20 is newly authenticated and not to provide the specific period at the timing when the ONU 20 is not newly authenticated.

(Flow of ONU Registration Method)

Figure 6:
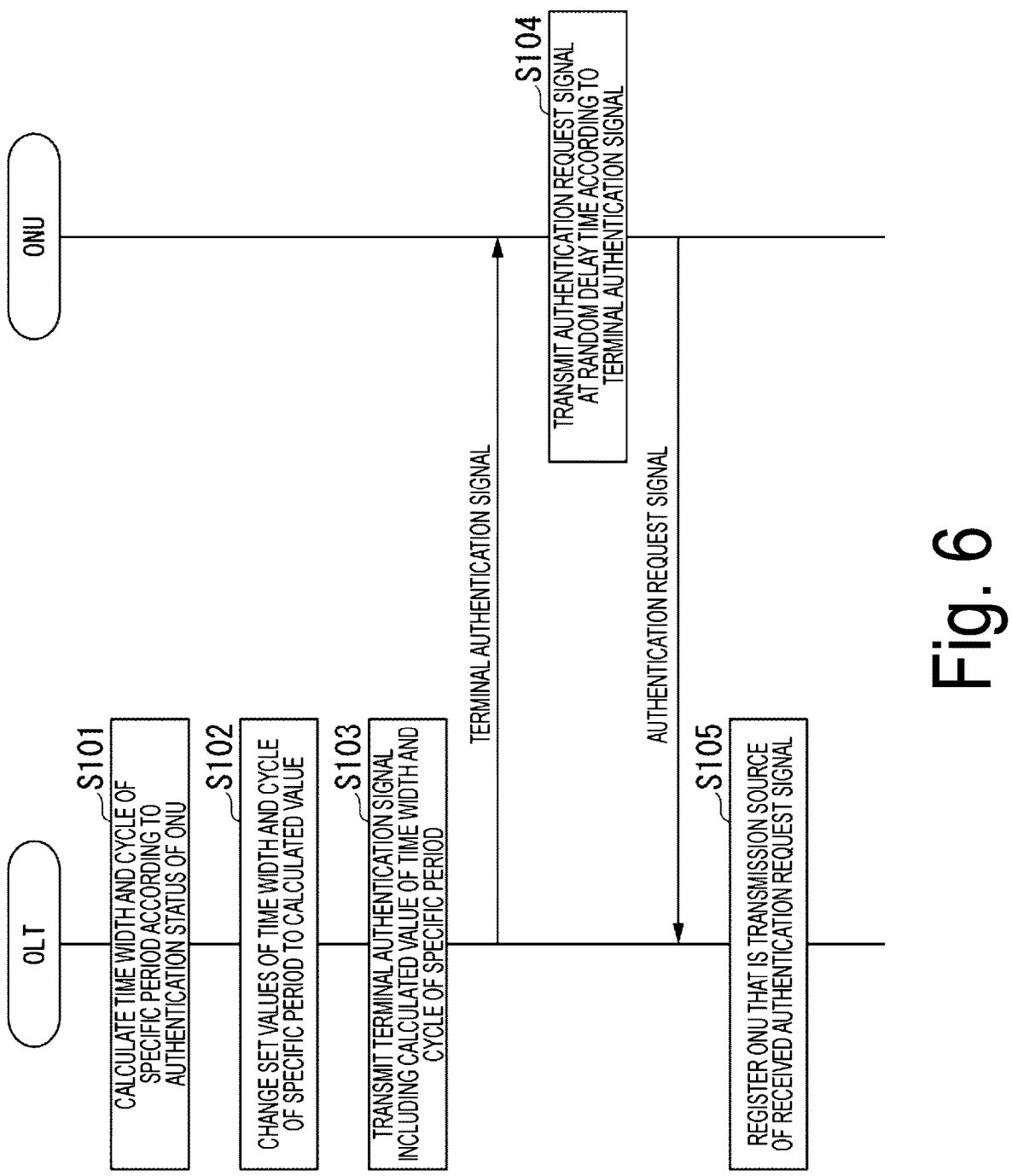
FIG. 6 is a diagram illustrating a flow of an ONU registration method in the first embodiment.

Next, a flow of a registration method of the ONU 20 in the first embodiment will be described. FIG. 6 is a diagram illustrating a flow of the registration method of the ONU 20 in the first embodiment. For example, the optical communication system 1 repeats steps S101 to S105 to change at least one of the time width Δt and the cycle T for each specific period. In the description using FIG. 6, both the time width Δt and the cycle T are changed as an example.

Figure 7:
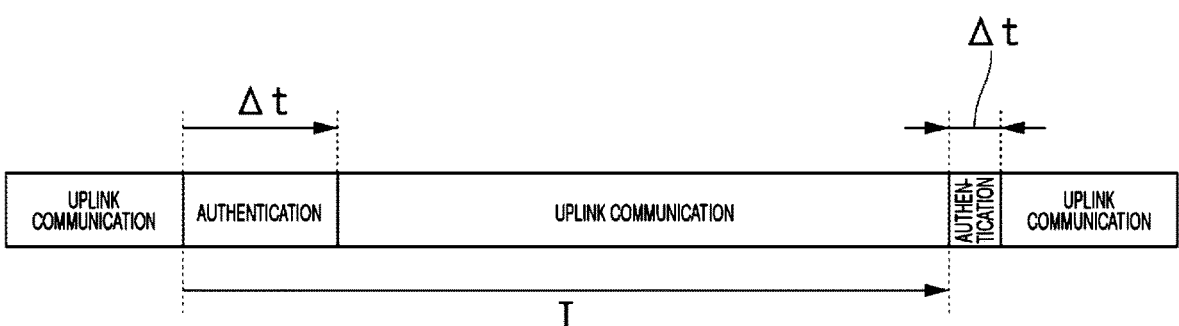
FIG. 7 is a diagram for illustrating a specific period in the first embodiment.

The OLT 10 calculates the time width Lt and the cycle T of the specific period in accordance with the authentication status of the ONU 20 (step S101). The OLT 10 changes the setting of the first set value and the cycle T stored in the storage unit 13 to the calculated values calculated in step S101 (step S102). As a result, as illustrated in FIG. 7, the time width t and the cycle T of the specific period of the present embodiment are not fixed values, and are dynamically changed, for example, for each specific period. Accordingly, the OLT 10 can improve a decrease in the band utilization efficiency of the uplink communication.

The OLT 10 transmits a terminal authentication signal including the calculated values of the time width Δt and the cycle T calculated in step S101 to the ONU 20 (step S103).

The ONU 20 receives the terminal authentication signal from the OLT 10 and transmits an authentication request signal with a random delay time corresponding to each calculated value included in the received terminal authentication signal (step S104). When the OLT 10 receives the authentication request signal within the specific period in which the time width Δt and the cycle T are changed in step S102, the OLT 10 registers (discovers) the ONU 20 that has transmitted the received authentication request signal (step S105).

As described above, the OLT 10 according to the first embodiment dynamically changes at least one of the time width Δt and the cycle T of the specific period that is a period for receiving an authentication request signal from a new ONU 20. As a result, the OLT 10 can reduce the time zone in which the uplink communication cannot be performed and improve the band utilization efficiency of the uplink communication.

MODIFICATION EXAMPLES

Figure 8:
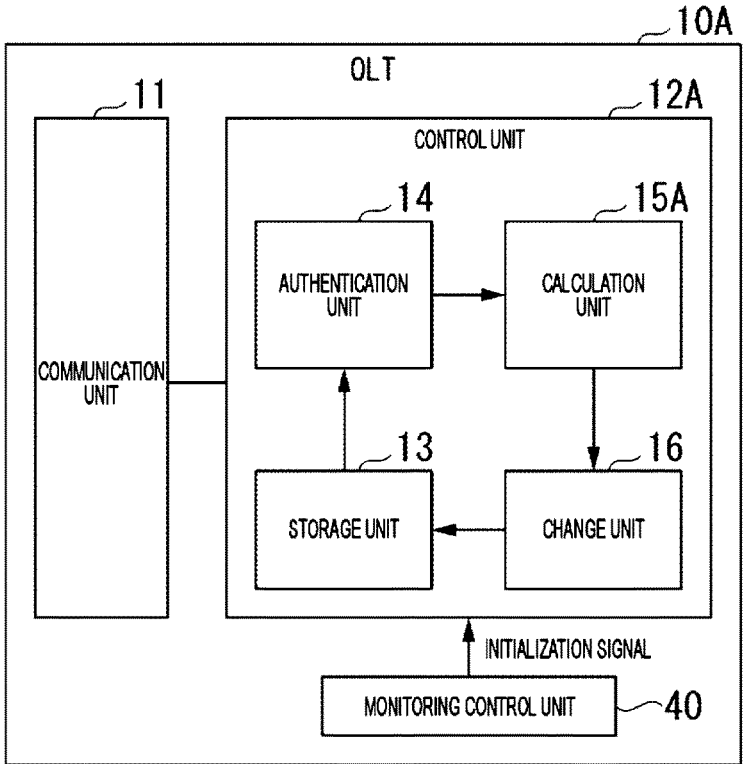
FIG. 8 is a diagram illustrating a modification example of the OLT of the first embodiment.

FIG. 8 is a diagram illustrating a modification example of the OLT 10 according to the first embodiment. As illustrated in FIG. 8, the OLT 10 may further include a monitoring control unit 40. Hereinafter, a modification example of the OLT 10 is referred to as an OLT 10A.

The OLT 10A includes the communication unit 11, a control unit 12A, and the monitoring control unit 40. The control unit 12A includes, for example, the storage unit 13, the authentication unit 14, a calculation unit 15A, and the change unit 16.

In a case where a failure of the OLT 10A is detected, the monitoring control unit 40 transmits an initialization signal to the control unit 12A. The monitoring control unit 40 detects the restart of the OLT 10A, and transmits an initialization signal to the control unit 12A in a case where the restart is detected. In a case of detecting the interruption of at least one of the uplink signal and the downlink signal, the monitoring control unit 40 transmits an initialization signal to the control unit 12A.

The calculation unit 15A has the same function as the calculation unit 15. In a case of receiving the initialization signal from monitoring control unit 40, the calculation unit 15A executes the initialization operation. The initialization operation is an operation of changing the time width Δt of the specific period and the cycle T of the specific period to preset values. For example, in a case of receiving the initialization signal from the monitoring control unit 40, the calculation unit 15A changes the time width Δt of the specific period to the maximum value of the settable time width Δt, and changes the cycle T of the specific period to the minimum value of the settable cycle. As a result, at the time of activation of the OLT 10 to which a large number of new ONUs 20 are predicted to be simultaneously connected, or the like, the OLT 10A can perform authentication of a larger number of new ONUs 20 by executing the initialization operation.

Second Embodiment

Figure 9:
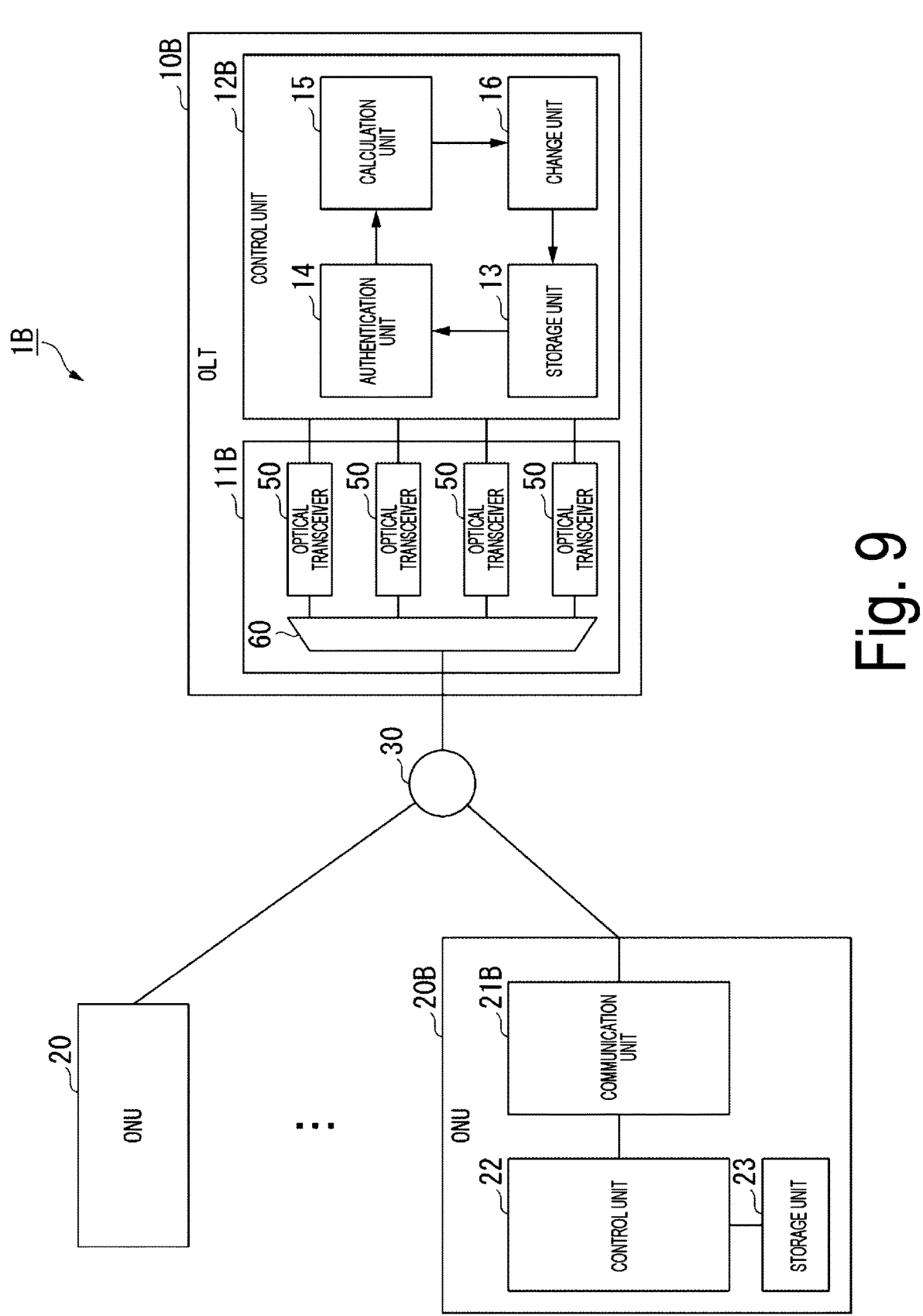
FIG. 9 is a diagram illustrating a configuration example of an optical communication system in a second embodiment.
Figure 10:
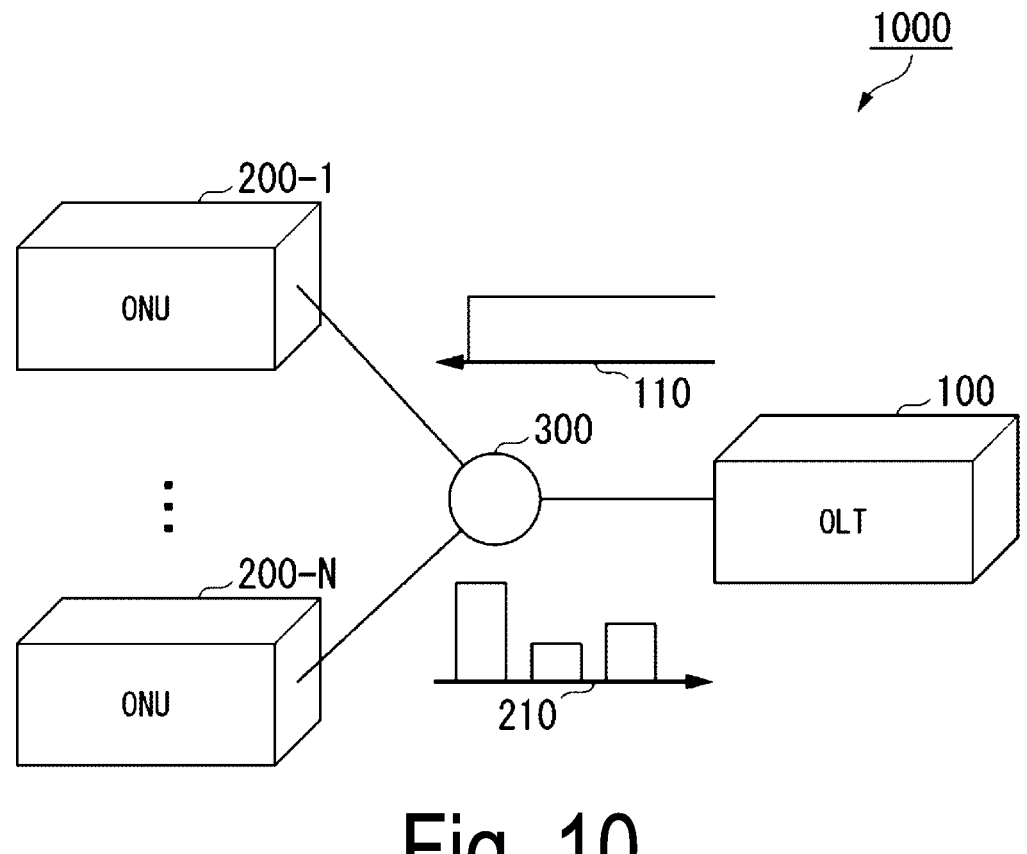
FIG. 10 is a diagram illustrating a configuration example of a conventional PON system 1000.
Figure 11:
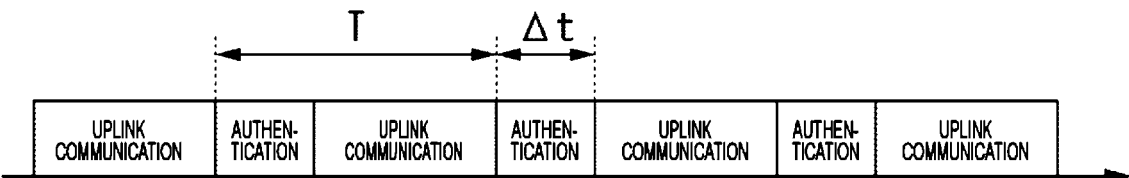
FIG. 11 is a diagram for illustrating authentication processing and uplink communication on a conventional time axis.
Figure 12:
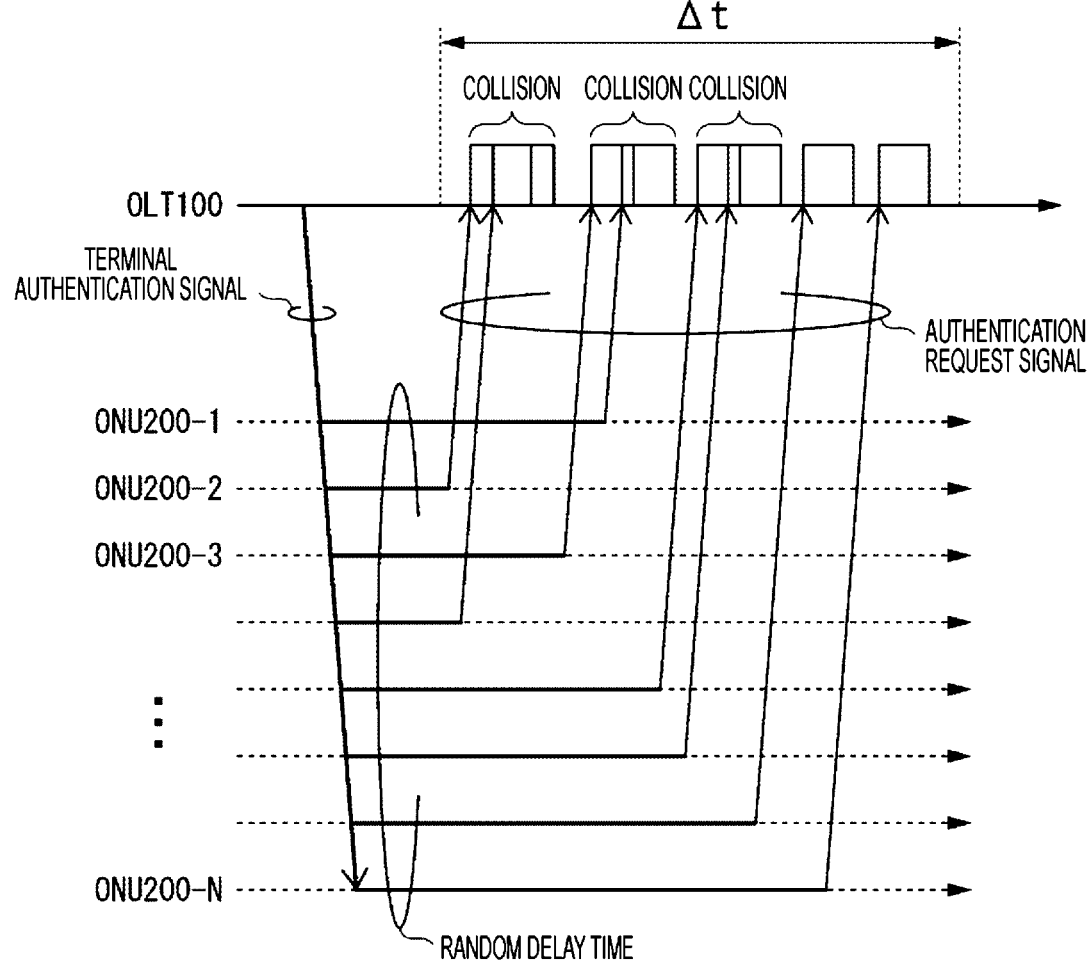
FIG. 12 is a diagram illustrating a problem in conventional authentication processing.

FIG. 9 is a diagram illustrating an example configuration of an optical communication system 1B according to a second embodiment. In the optical communication system 1B of the second embodiment, the OLT 10 and the ONU 20 communicate using a plurality of wavelengths. In the following description, parts having functions similar to those described in the first embodiment will be denoted by similar names and reference numerals, and a specific description regarding the functions will be omitted.

The optical communication system 1B includes an OLT 10B and a plurality of ONUs 20B-1 to 20B-N. The OLT 10B and the ONUs 20B-1 to 20B-N are communicably connected via an optical multiplexer/demultiplexer 30 including an optical transmission line, an optical splitter, and the like. Note that the plurality of ONUs 20B-1 to 20B-N will be simply referred to as "ONU 20B" when they are not distinguished from one another.

For example, the OLT 10B and the plurality of ONUs 20B-1 to 20B-N communicate with each other by a communication scheme using a wavelength division multiplexing technology. Therefore, the ONUs 20B-1 to 20B-N transmit optical signals of different wavelengths. Note that it is not necessary for all the ONUs 20B-1 to 20B-N to transmit optical signals having different wavelengths, and some of the ONUs may transmit optical signals having different wavelengths. In the following description, a case where all the ONUs 20B-1 to 20B-N transmit optical signals of different wavelengths will be described as an example.

As illustrated in FIG. 9, the OLT 10B includes a communication unit 11B and a control unit 12B. A part or all of the control unit 12B may be realized, for example, by a processor such as a CPU executing a program stored in the storage unit 13B, or may be realized by using hardware such as an LSI or an ASIC).

The communication unit 11B performs bidirectional communication with the ONU 20B using a wavelength division multiplexing technique. For example, the communication unit 11B includes a plurality of optical transceivers 50 and a multiplexer/demultiplexer 60.

The plurality of optical transceivers 50 are connected to the control unit 12B. The plurality of optical transceivers 50 generate optical signals having different wavelengths and transmit the optical signals to the multiplexer/demultiplexer 60. The plurality of optical transceivers 50 receive the optical signal demultiplexed and output for each wavelength from the multiplexer/demultiplexer 60.

The multiplexer/demultiplexer 60 combines a plurality of optical signals having different wavelengths generated by the plurality of optical transceivers 50 to generate a downlink WDM signal. The downlink WDM signal is transmitted to the ONUs 20B-1 to 20B-N. The multiplexer/demultiplexer 60 receives an uplink WDM signal obtained by multiplexing each uplink signal from each ONU by the optical multiplexer/demultiplexer 30. Then, the multiplexer/demultiplexer 60 demultiplexes the uplink WDM signal and outputs the demultiplexed signal to each optical transceiver 50.

The control unit 12B has the same configuration as the control unit 12. The control unit 12B may include the monitoring control unit 40 described above. Here, the control unit 12B may manage the number of ONUs 20B registered for each wavelength, and set the time width Δt and the cycle T of the specific period based on the authentication status of the managed ONU 10B. In this case, for example, the control unit 12B may set the unauthenticated number n to a value obtained by dividing the number of ONUs 20B in the entire optical communication system 1B by the number of wavelengths. In the OLT 10B, the maximum registration number of the ONUs 20B for each wavelength may be registered in advance. The number of ONUs 10B registered in the OLT 20B may be the sum of all wavelengths, and the control unit 12B may collectively control the time width ΔT and the cycle T.

Hereinafter, a schematic configuration of the ONU 20B for executing the authentication processing of the present embodiment will be described. The ONU 20 of the present embodiment includes a communication unit 21B, the control unit 22, and the storage unit 23.

The communication unit 21B transmits and receives optical signals to and from the communication unit 11B. For example, the communication unit 21 communicates with the communication unit 11B by a communication scheme using a wavelength division multiplexing technology.

Note that the method of calculating the time width Δt and the cycle T of the second embodiment is similar to that of the first embodiment, and thus the description thereof will be omitted. Since the flow of the registration method of the ONU 20B of the second embodiment is similar to that of the first embodiment, the description thereof will be omitted.

As described above, the OLT 10B in the second embodiment has the same effects as those of the first embodiment.

Some functions of the OLTs 10, 10A, and 10B and the ONUs 20 and 20B in the above-described embodiments may be implemented by a computer. In that case, the program for achieving these functions may be recorded in a computer-readable recording medium, and the program recorded in the recording medium may be read and executed by a computer system to achieve the functions. Note that the "computer system" mentioned herein includes hardware such as an OS and peripheral devices. Also, the "computer-readable recording medium" refers to a portable medium such as a flexible disk, a magneto-optical disk, a ROM, or a CD-ROM, or a storage device such as a hard disk included in a computer system. Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside a computer system serving as a server or a client in that case. Also, the above program may be for achieving some of the functions described above, may be formed with a combination of the functions described above and a program already recorded in a computer system, or may be formed with a programmable logic device such as an FPGA.

As above, the embodiments of the present invention have been described in detail with reference to the drawings. On the other hand, the specific configuration is not limited to the embodiments, and includes design and the like without departing from the spirit of the present invention.

Reference throughout the specification to a portion as "including," "having," or "comprising" a component means that the portion does not exclude other components but may further include other components unless specifically stated to the contrary.

In addition, the term " . . . unit" described in the specification means a unit that processes at least one function or operation, which may be embodied as hardware or software, or may be embodied in a combination of hardware and software.

INDUSTRIAL APPLICABILITY

The present invention can be applied to an optical line terminal that communicates with a plurality of optical network units.

REFERENCE SIGNS LIST

1 Optical communication system
10, 10A, 10B OLT
11, 11B Communication unit
12, 12A, 12B Control unit
13 Storage unit
14 Authentication unit
15, 15A Calculation unit
16 Change unit
20, 20B ONU

The invention claimed is:

1. An optical line terminal comprising:
a communicator configured to communicate with a plurality of optical network units; and
a controller configured to dynamically change at least one of a time width of a specific period and a cycle of the specific period, the specific period being a period in which an authentication request signal is received from a new optical network unit via the communicator,

wherein the controller changes at least one of a time width of the specific period and a cycle of the specific period based on authentication statuses of the plurality of optical network units,
wherein the controller changes the time width so that a probability of the optical network unit that is expected to be authenticated in one specific period becomes equal to or greater than a preset threshold with respect to an unauthenticated number that is the number of unauthenticated optical network units.

2. The optical line terminal according to claim 1, wherein the controller changes the cycle of the specific period based on a change over time of the number of newly authenticated optical network units.

3. The optical line terminal according to claim 2, wherein the controller changes the cycle of the specific period to a cycle longer than the current cycle in a case where the number of newly authenticated optical network units is equal to or less than a threshold in a preset time interval.

4. The optical line terminal according to claim 1, wherein the communicator transmits at least one of the time width and the cycle changed by the controller to the optical network unit.

5. The optical line terminal according to claim 1, wherein the communicator communicates with the plurality of optical network units using a plurality of wavelengths, and
the controller manages a number of the optical network units for each of the wavelengths, and changes at least one of a time width and a cycle of the specific period based on an authentication status of the managed optical network unit.

6. The optical line terminal according to claim 1, wherein the controller changes the time width of a specific period to the maximum possible value and changes the cycle of the specific period to the minimum possible value, when receives an initialization signal.

7. A registration method in which an optical line terminal registers a new optical network unit, the method comprising:
dynamically changing at least one of a time width of a specific period for receiving an authentication request signal from the new optical network unit and a cycle of the specific period; and
registering the optical network unit that has transmitted the received authentication request signal in a case where the authentication request signal is received from the new optical network unit within the specific period changed,
changing at least one of a time width of the specific period and a cycle of the specific period based on authentication statuses of a plurality of optical network units,
changing the time width so that a probability of the optical network unit that is expected to be authenticated in one specific period becomes equal to or greater than a preset threshold with respect to an unauthenticated number that is the number of unauthenticated optical network units.

* * * * *